(12) United States Patent
Kato et al.

(10) Patent No.: US 6,448,868 B2
(45) Date of Patent: Sep. 10, 2002

(54) HIGH-FREQUENCY SWITCH

(75) Inventors: Mitsuhide Kato, Sabae; Hideki Muto, Takefu, both of (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 09/761,308

(22) Filed: Jan. 17, 2001

(30) Foreign Application Priority Data

Jan. 21, 2000 (JP) .......................................... 2000-013548

(51) Int. Cl.[7] .................................................. H01P 1/15
(52) U.S. Cl. ........................ 333/103; 333/104; 333/262; 455/78
(58) Field of Search ................................. 333/103, 104, 333/134, 126, 204, 219, 185, 132, 262; 455/78

(56) References Cited

U.S. PATENT DOCUMENTS

| | | | | |
|---|---|---|---|---|
| 5,519,364 A | * | 5/1996 | Kato et al. | 333/103 |
| 5,699,023 A | * | 12/1997 | Tanaka et al. | 333/103 |
| 5,783,976 A | * | 7/1998 | Furutani et al. | 333/134 |
| 5,914,544 A | * | 6/1999 | Tanaka et al. | 307/130 |
| 5,929,510 A | * | 7/1999 | Geller et al. | 257/635 |
| 6,072,993 A | * | 6/2000 | Trikha et al. | 455/78 |
| 6,108,527 A | * | 8/2000 | Urban et al. | 455/115 |
| 6,115,585 A | * | 9/2000 | Matero et al. | 455/78 |
| 6,125,266 A | * | 9/2000 | Matero et al. | 455/126 |

* cited by examiner

*Primary Examiner*—Robert Pascal
*Assistant Examiner*—Dean Takaoka
(74) *Attorney, Agent, or Firm*—Keating & Bennett, LLP

(57) ABSTRACT

A high-frequency switch having a greatly reduced occurrence of high harmonic signals includes first and second switches, and each of these two switches includes two diodes and two transmission lines. Besides, one of the two voltage control terminals is connected, via a resistor, to the intermediate connection point between the anode of one of the two diodes of the first switch and one of the two transmission lines of the first switch. The other of the voltage control terminals is connected, via another resistor, to the intermediate connection point between the anode of one of the two diodes of the second switch and one of the two transmission lines of the second switch.

17 Claims, 14 Drawing Sheets

HIGH-FREQUENCY SWITCH

BACKGROUND OF THE INVENTION

1. Field of the Invention

The present invention relates to a high-frequency switch, and more particularly, to a high-frequency switch used as a built-in component in mobile communication equipment adapting to two frequency-band systems.

2. Description of the Related Art

Portable telephones incorporating two transmission/reception circuits and capable of adapting to a dual band are well known. Current portable telephone systems use, for example, the combination of GSM (operating frequency band: 800 MHz to 1 GHz) and DCS1800 (operating frequency band: 1.7 GHz to 1.8 GHz), the combination of the GSM and PCS (operating frequency band: 1.8 GHz to 1.9 GHz). A high-frequency switch incorporating two switches to switch between the transmission circuit and the reception circuit of each of these two transmission/reception circuits has been proposed.

FIG. 16 is an electric circuit diagram showing a conventional high-frequency switch. For example, the high-frequency switch 1 includes a switch 1a for use with GSM, and switch 1b for use with DCS. To the transmission-side terminals Tx1 and Tx2 of the switches 1a and 1b, the cathodes of diodes D1 and D3 are connected, respectively. The cathodes of the diodes D1 and D3 are grounded via transmission lines 2 and 4, respectively. The anodes of the diodes D1 and D3 are connected to antenna-side terminals ANT1 and ANT2, respectively.

To the antenna-side terminals ANT1 and ANT2, reception-side terminals Rx1 and Rx2 are connected via transmission lines 3 and 5, respectively. To the reception-side terminal Rx1 and Rx2, the cathodes of diodes D2 and D4 are connected, respectively. The anodes of the diodes D2 and D4 are grounded via capacitors C1 and C2, respectively. Voltage control terminals Vc1 and Vc2 are connected to the respective intermediate connection points between the anodes of the diodes D2 and D4, and the capacitors C1 and C2, via resistors R1 and R2, respectively.

In this high-frequency switch 1, the antenna-side terminals ANT1 and ANT2 are each electrically connected to an antenna element 8 via a diplexer which performs the function of mixing or distributing signals of two frequency bands (GSM and DCS for example), and which includes LPF/HPF, BEF/BEF, LPF/BEF, or BEF/HPF, and the transmission-side terminals Tx1 and Tx2 are electrically connected to the transmission circuits (not shown) of GSM and DCS1800, respectively, and the reception-side terminals Rx1 and Rx2 are electrically connected to the reception circuit (not shown) of GSM and DCS1800, respectively. By controlling the voltage applied to the voltage control terminals Vc1 and Vc2, the switch 1a is brought into the transmission mode and the switch 1b is brought into the reception mode during transmission from the switch 1a, while, during transmission from the switch 1b, the switch 1b is brought into the transmission mode and the switch 1a is brought into the reception mode.

In the conventional high-frequency switch 1, however, when the switch 1a is brought into the transmission mode and the switch 1b is brought into the reception mode during transmission from the switch 1a, high harmonic signals such as a second harmonic and a third harmonic of the transmission signal of GSM connected to the switch 1a are transmitted from the antenna element 8.

These high harmonic signals occur because when the switch 1b is in the reception mode, the two diodes D3 and D4 are in the off-state. However, since the point X1 shown in FIG. 16 is connected to the ground via not only the transmission lines 4 and 5 and capacitor C2, but also the diodes D3 and D4 in the off-state, the voltage at the point X1 fluctuates. Once the voltage at the point X1 fluctuates, the diodes D3 and D4, which are non-linear elements, vary in capacitance. If a transmission signal flowing through the switch 1a leaks to the switch 1b, high harmonics occur from this transmission signal due to a variation in the capacitance. In particular, the second harmonic of a GSM transmission signal is readily transmitted from the antenna element 8, since the transmission frequency of the second harmonic of the GSM transmission signal overlaps with the DCS1800 transmission frequency.

SUMMARY OF THE INVENTION

To overcome the above-described problems, preferred embodiments of the present invention provide a high-frequency switch having a low occurrence of high harmonic signals.

The high-frequency switch in accordance with a preferred embodiment of the present invention includes a first switch for use with a first transmission/reception band, the first switch having at least two switching elements, a second switch for use with a second transmission/reception band using a frequency different from the operating frequency of the first transmission/reception band, the second switch having at least two switching elements, and a mechanism to apply a voltage between the two switching elements of one of the first and second switches when the other of the switches is in a state of the transmission mode. Herein, as the voltage applying mechanism, for example, a resistor electrically connected between the first and second switches may be used.

Preferably, each of the first and second switches includes a first terminal, a second terminal, a third terminal, and a voltage control terminal, a first diode of which the cathode is electrically connected to the first terminal side, and of which the anode is electrically connected to the second terminal side, a first transmission line electrically connected between the second terminal and the third terminal, a second diode of which the cathode is electrically connected to the third terminal side, and of which the anode is electrically connected to the voltage control terminal side, and a second transmission line electrically connected between the first terminal and a ground.

The arrangement is such that each of the first and second switches includes a first terminal, a second terminal, a third terminal, and a voltage control terminal, and a first diode of which the anode is electrically connected to the first terminal side, of which the cathode is electrically connected to the second terminal side, a first transmission line electrically connected between the second terminal and the third terminal, a second diode electrically connected between the third terminal and a ground in the state wherein the anode is electrically connected to the third terminal side, and a second transmission line electrically connected between the first terminal and the voltage control terminal.

With these unique features and arrangements, when one of the first and second switches is in a state of the transmission mode, even though the other switch is in a reception mode, a voltage is applied by the voltage applying mechanism, to a predetermined point between the two switching elements of the other switch, so that the voltage at this point is constant. This prevents the bias voltage of the switching elements of the other switch from fluctuating, which results in greatly reduced occurrences of high harmonic signals.

Furthermore, it is preferable that, in the high-frequency switch in accordance with preferred embodiments of the present invention, on the surface of the laminated body constructed by laminating a plurality of dielectric layers and the first and second transmission lines of each of the first and second switches, the first, second, and third terminals and the voltage control terminals of each of the first and second switches be provided, as well as the first and second diodes as the first and second switches, and resistors as the voltage applying mechanism be mounted.

With these unique features and arrangements, a laminated high-frequency switch having necessary circuits built into a single component is achieved. This eliminates the necessity for matching adjustment components for connecting matching adjustment elements required to assemble components for the two switches.

Other features, elements, characteristics and advantages of present invention will become apparent from the following detailed description of preferred embodiments thereof with reference to the attached drawings.

DETAILED DESCRIPTION OF PREFERRED EMBODIMENTS

Figure 1:
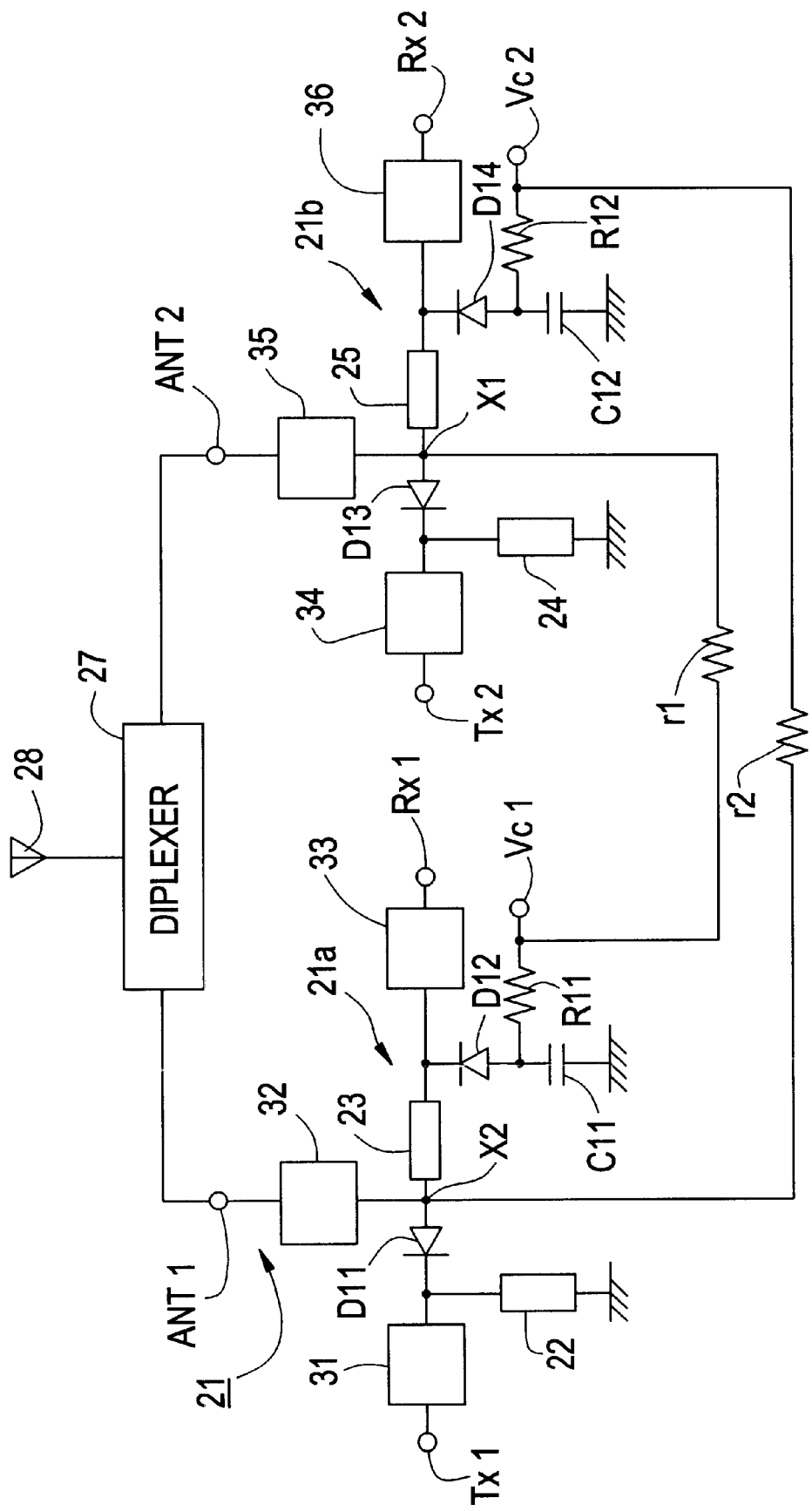
FIG. 1 is an electric circuit diagram showing a first preferred embodiment of a high-frequency switch in accordance with the present invention.

FIG. 1 is an electric circuit diagram showing an example of a high-frequency switch in accordance with a first preferred embodiment of the present invention. The high-frequency switch 21 includes two switches 21a and 21b. To the transmission-side terminals Tx1 and Tx2 of the switches 21a and 21b, the cathodes of diodes D11 and D13, which are each switching elements, are connected via filters 31 and 34, respectively. The cathodes of the diodes D11 and D13 are grounded via transmission lines 22 and 24, respectively. Each of the transmission lines 22 and 24 performs the function of choke elements. The anodes of the diodes D11 and D13 are connected to the antenna-side terminals ANT1 and ANT2 via filters 32 and 35, respectively.

To the antenna-side terminals ANT1 and ANT2, reception-side terminals Rx1 and Rx2 are connected via the filters 32 and 35, the transmission lines 23 and 25, and filters 33 and 36, respectively.

To the reception-side terminals Rx1 and Rx2, the cathodes of the diodes D12 and D14 are connected via the filters 33 and 36, respectively. The anodes of the diodes D12 and D14 are grounded via bias-cut capacitors C11 and C12, respectively. Voltage control terminals Vc1 and Vc2 are connected to the respective intermediate connection points between the anodes of the diodes D12 and D14, and capacitors C11 and C12 via resistors R11 ad R12, respectively. A control voltage for switching transmission lines of the high-frequency switch 21 is applied to these voltage control terminals Vc1 and Vc2. The resistance value of the resistors R11 and R12 are preferably, for example, about 100 Ω to about 5 kΩ.

Also, to the respective intermediate connection points (points X2 and X1) between the anodes of the diodes D11 and D13, and the transmission lines 23 and 25, the voltage control terminals Vc2 and Vc1 are connected via resistors r2 and r1, respectively.

Herein, as the transmission lines 22 through 25, distributed constant lines each having characteristic impedance not less than about 40Ω or high-frequency inductances are used. In a distributed constant line, the length of each of the transmission lines 22 through 25 is preferably in the range of from about λ/12 to about λ/4 inclusive (λ: the wave length at a desired frequency).

Figure 2:
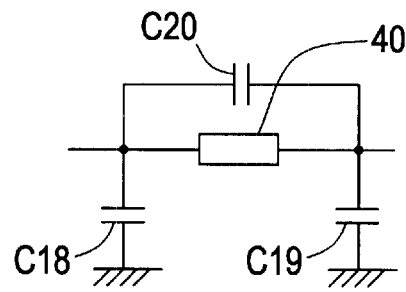
FIG. 2 is an electric circuit diagram illustrating an example of a filter used in the high-frequency switch shown in FIG. 1.

For each of the filters 31 through 36, for example, a third low-pass filter as shown in FIG. 2 is used. The opposite sides of transmission line 40 are each grounded via capacitors C18 and C19. Capacitor 20 is connected in parallel with the transmission line 40. As the transmission line 40, a distributed constant line or a high-frequency inductance is used. Here, the filters 31 through 36 are not necessarily required. These filters may be omitted depending on the desired use.

Figure 3:
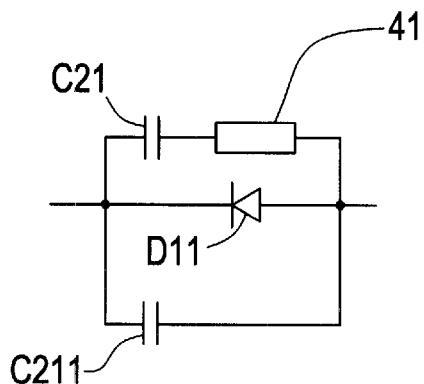
FIG. 3 is an electric circuit diagram showing a modification for improving the isolation when a diode is in the off-state.

Also, as shown in FIG. 3, across the opposite sides (across the anode and cathode) of each of the diodes D11 and D13, a series circuit including a transmission line 41 and a capacitor 21 are connected, or a capacitor C211 may be connected. The transmission line 41 and the capacitor 21 are used to improve the isolation when the diodes D11 and D13 are in the off-state.

Next, the transmission through the use of the high-frequency switch 21 will be described. As shown in FIG. 1, in the high-frequency switch 21, the antenna-side terminals ANT1 and ANT2 are each connected to an antenna element 28 via a diplexer 27, and the transmission-side terminal Tx1 and the reception-side terminal Rx1 of the switch 21a are electrically connected to the transmission and reception circuits (not shown) of GSM (first high-frequency signal), respectively, while the transmission-side terminal Tx2 and the reception-side terminal Rx2 of the switch 21b are electrically connected to the transmission and reception circuits (not shown) of DCS1800 (second high-frequency signal), respectively.

Figure 4:
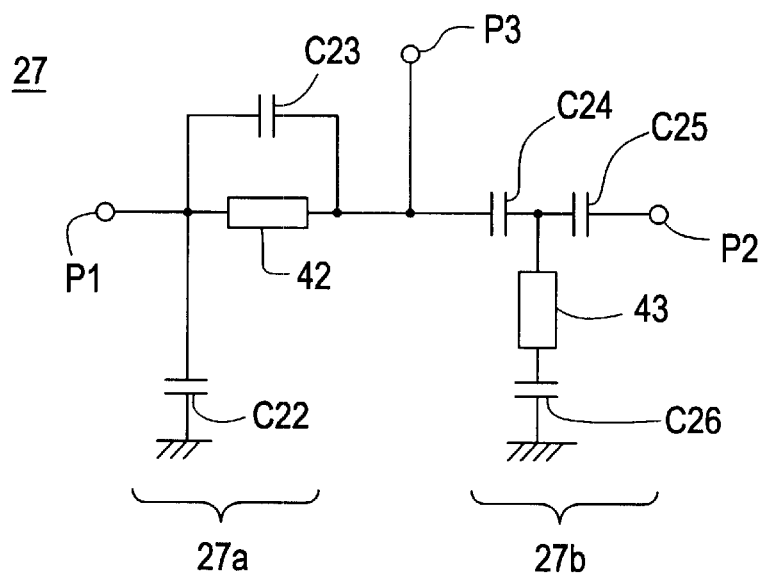
FIG. 4 is an electric circuit diagram showing an example of a diplexer.

The diplexer 27 is used for switching between the frequency band of GSM and that of DCS1800, and as shown in FIG. 4, the diplexer is constructed by combining a low-pass filter 27a and a high-pass filter 27b. The low-pass filter 27a includes a transmission line 42, a capacitor 22 connected between one end of the transmission line 42 and a ground, and a capacitor 23 connected in parallel with the transmission line 42. The high-pass filter 27b is constructed by T-connecting the series circuit of two capacitors C24 and C25, and the series circuit of a transmission line 43 and a capacitor 26. The input/output ports P1 and P2 of the diplexer 27 are electrically connected to the antenna-side terminals ANT1 and ANT2 of the high-frequency switch 21, respectively, and an input/output port P3 is electrically connected to the antenna element 28.

When a positive potential is applied to the voltage control terminal Vc1 (the first voltage control terminal) of the high-frequency switch 21 and a ground potential is applied to the voltage control terminal Vc2 (the second voltage control terminal) thereof, the positive potential applied to the voltage control terminal Vc1 acts as a forward bias-voltage on the diodes D11 and 12 of the switch 21a. Here, to the voltage control terminal Vc2, a negative potential or a weak positive potential (0 to 0.4 V for example) may be applied in place of the ground potential (hereinafter, the same goes whenever a ground potential is applied to the voltage control terminal).

Thereby, the diodes D11 and D12 are turned ON, and the switch 21a enters into a state of the transmission mode. As a result, the GSM transmission signal entered in the transmission-side terminal Tx1 is transmitted to the antenna-side terminal ANT1 via the diode D11. At this time, the GSM transmission signal is not substantially transmitted to the reception-side terminal Rx1. Since the inductance which the diode D12 possesses is itself in the On-state, and the capacity of the capacitor C11 causes series resonance at the transmission frequency, and the impedance of this series resonance circuit becomes 0, each of the transmission lines 22 and 23 operates as a short stub with a line length of about λ/4, and hence the transmission-side terminal Tx1 and the antenna-side terminal ANT1 are connected, and the reception-side terminal Rx1 is grounded.

Furthermore, the positive potential which has been applied to the voltage control terminal Vc1, is applied to the intermediate connection point (point X1) between the anode of the diode D13 of the other switch 21b and the transmission line 25 via the resistor r1, thereby makes the point X1 a positive potential. This results in a state wherein the diodes D13 and D14 of the switch 21b are being subjected to a voltage. This makes the capacities of the diodes D13 and D14 constant. Even if the GSM transmission signal flowing through the switch 21a leaks to the switch 21b, therefore, the occurrence of high harmonic (second harmonic, third harmonic, etc.) signals, from this transmission signal, due to variations in the capacity of the diodes D13 and D14, is substantially inhibited. This leads to an improvement in spurious characteristics due to the non-linearity of the diodes.

Herein, if the resistance value of the resistor r1 is reduced (to approximately 10 kΩ or below), the diode D13 is turned ON, and the potential of the point X1 becomes stable. At this time, the switch 21b is in a state of being in neither transmission mode nor reception mode.

Herein, if the current flowing through the resistor r1 is increased, power consumption also increases. The resistance value of the resistor r1, therefore, is set, for example, to at least about 500Ω. If the resistance value of the resistor r1 is too large, however, the instability of the potential of the point X1 increases. In this first preferred embodiment, therefore, the resistance value of the resistor r1 is preferably approximately 3 kΩ. The resistor is also set to approximately 3 kΩ.

On the other hand, when a ground potential is applied to the voltage control terminal Vc1 and a positive potential is applied to the voltage control terminal Vc2, the positive potential applied to the voltage control terminal Vc2 acts as a forward bias-voltage on the diodes D13 and 14 of the switch 21b. Thereby, the diodes D13 and D14 are turned ON, and the switch 21b enters into a state of the transmission mode. As a result, the DCS1800 transmission signal entered in the transmission-side terminal Tx2 is transmitted to the antenna-side terminal ANT2 via the diode D13.

Furthermore, the positive voltage which is applied to the voltage control terminal Vc2, is applied to the intermediate connection point (point X2) between the anode of the diode D11 of the other switch 21a and the transmission line 23 via the resistor r2, thereby the point X2 has a given positive potential. This results in a state wherein the diodes D11 and D12 of the switch 21a are subjected to a given voltage. This makes the capacities of the diodes D11 and D12 constant. Even if the DCS1800 transmission signal flowing through the switch 21b leaks to the switch 21a, therefore, the occurrence of high harmonic (second harmonic, third harmonic, etc.) signals, from this transmission signal, due to variations in the capacity of the diodes D11 and D12, is prevented.

Herein, if the resistance value of the resistor r2 is reduced (to approximately 10 kΩ or below), the diode D11 is turned ON, and the potential of the point X2 is stable.

Figure 5:
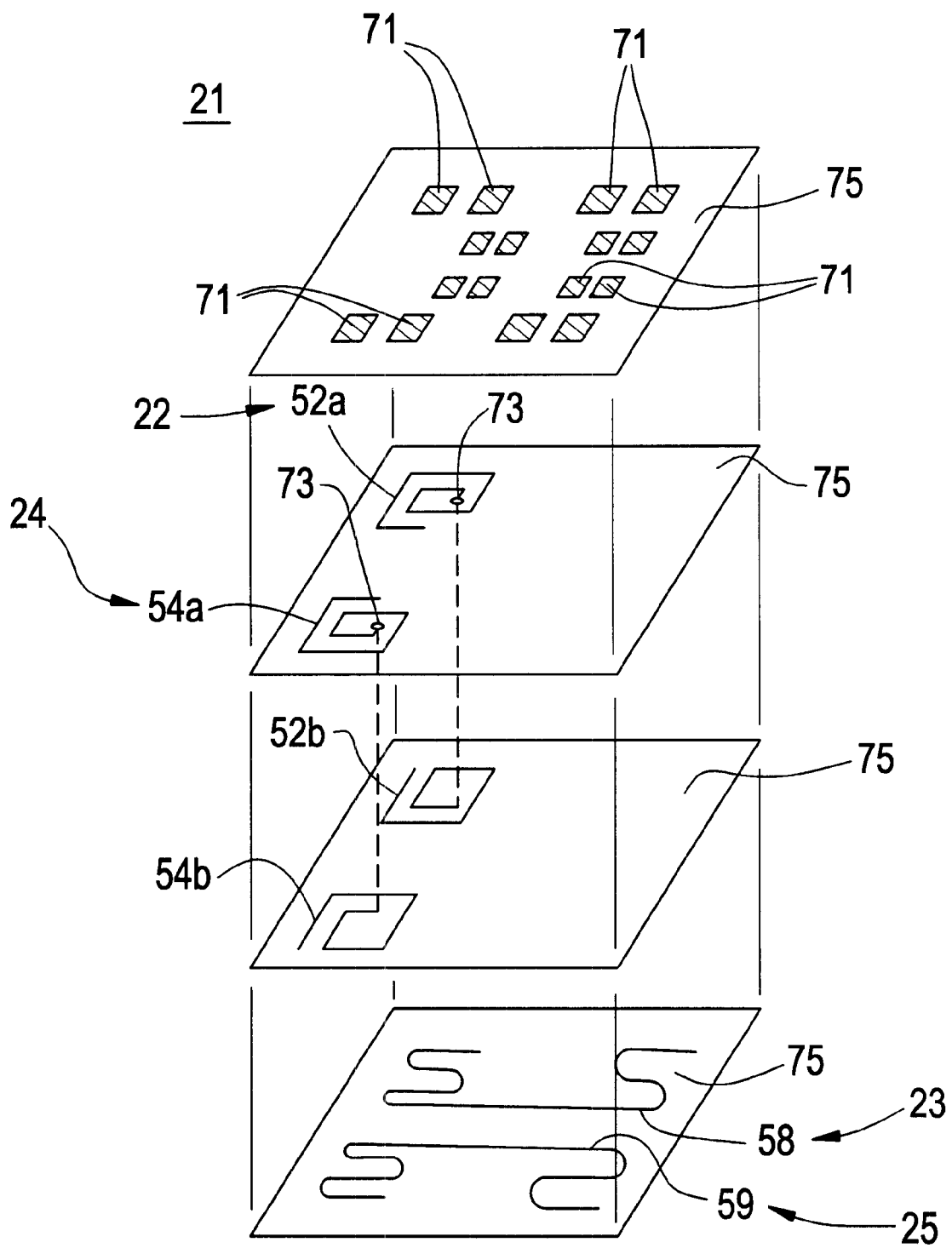
FIG. 5 is an explosive perspective view conceptually illustrating the construction of a laminated high-frequency switch having the electric circuit of the high-frequency switch shown in FIG. 1.

Next, an example of a laminated high-frequency switch 21 having the electric circuit shown in FIG. 1, will be described with reference to FIGS. 5 and 6. FIG. 5 is an explosive perspective view conceptually illustrating the construction of a laminated high-frequency switch 21 having the electric circuit shown in FIG. 1. In FIG. 5, via holes for electrically interconnecting layers are described only partially, and all of the lead-out electrodes for electrically connecting internal electrodes and external terminals are omitted. All of the filters 31 through 36 are also omitted.

The high-frequency switch 21 includes a dielectric sheet 75 having distributed constant lines 52a and 54a, a dielectric sheet 75 having distributed constant lines 52b and 54b, a dielectric sheet 75 having distributed constant lines 58 and 59, and a dielectric sheet 75 having a pad 71.

The distributed constant lines 52a and 52b each have, for example, spiral shapes, and are electrically connected in series via holes 73 provided in the sheet 75, thereby defining the transmission line 22. Likewise, the distributed constant lines 54a and 54b are also electrically connected in series via holes 73 provided in the sheet 75, and thereby define the transmission line 24. The distributed constant lines 58 defining the transmission line 23, and the distributed constant lines 59 defining the transmission line 25 are disposed on the rear side and the front side of the sheet 75, respectively.

Figure 6:
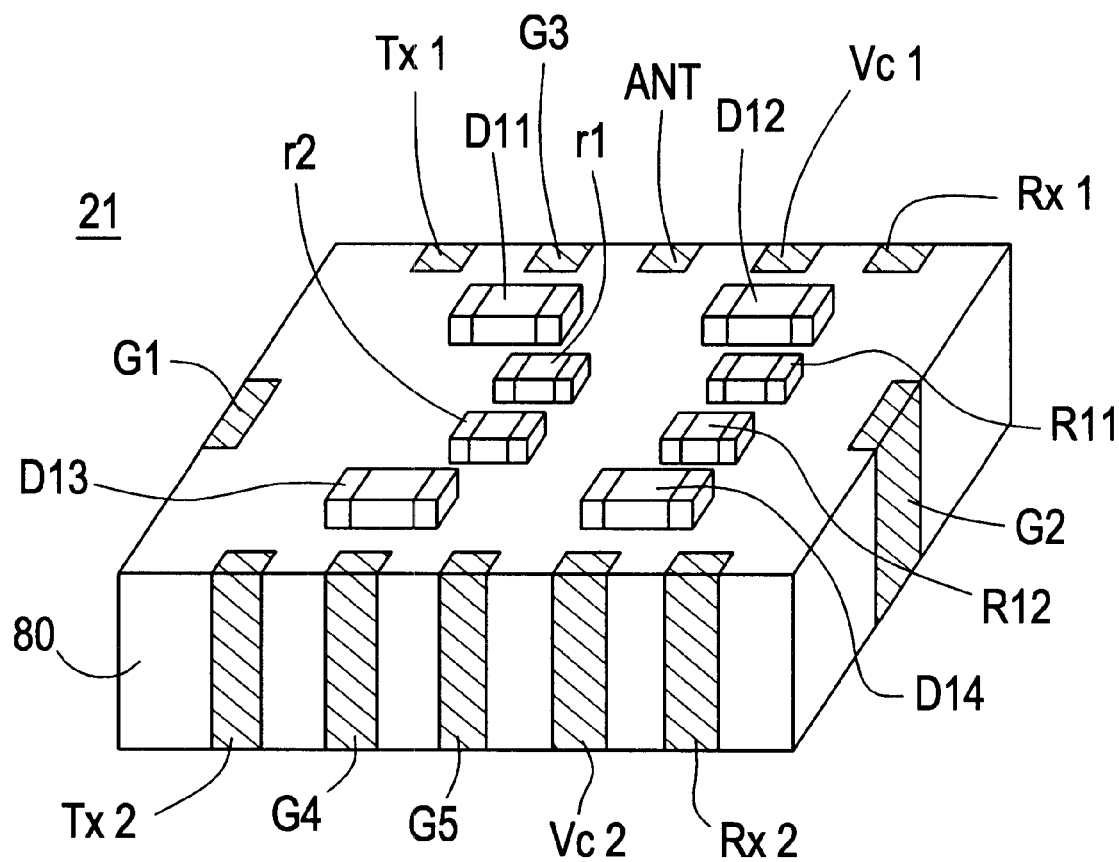
FIG. 6 is a perspective view illustrating an appearance of the high-frequency switch shown in FIG. 5.

All sheets having the above-described features are laminated, and integrally fired to define a laminated body 80, as illustrated in FIG. 6. On the side portion on the rear side of the laminated body 80, the transmission-side terminal Tx1, the antenna-side terminal ANT, the voltage control terminal Vc1, the reception-side terminal Rx1, and the ground terminal G3 of the switch 21a are provided. On the side portion on the front side of the laminated body 80, the transmission-side terminal Tx2, the voltage control terminal Vc2, the reception-side terminal Rx2, and the ground terminals G4 and G5 of the switch 21b are provided. On the side portions on the left and right sides of the laminated body 80, ground terminals G1 and G2 are provided, respectively. On the pads 71 on the top surface of the laminated body 80, the diodes D11 through D14, and the resistors R11, R12, r1, and r2 are soldered. The laminated high-frequency switch 21 thus obtained has a configuration wherein the rear half thereof constitutes a switch 21a while the front half thereof constitutes a switch 21b, and wherein the patterns and elements on the rear side and those on the front side are substantially symmetrically disposed to each other.

Figure 7:
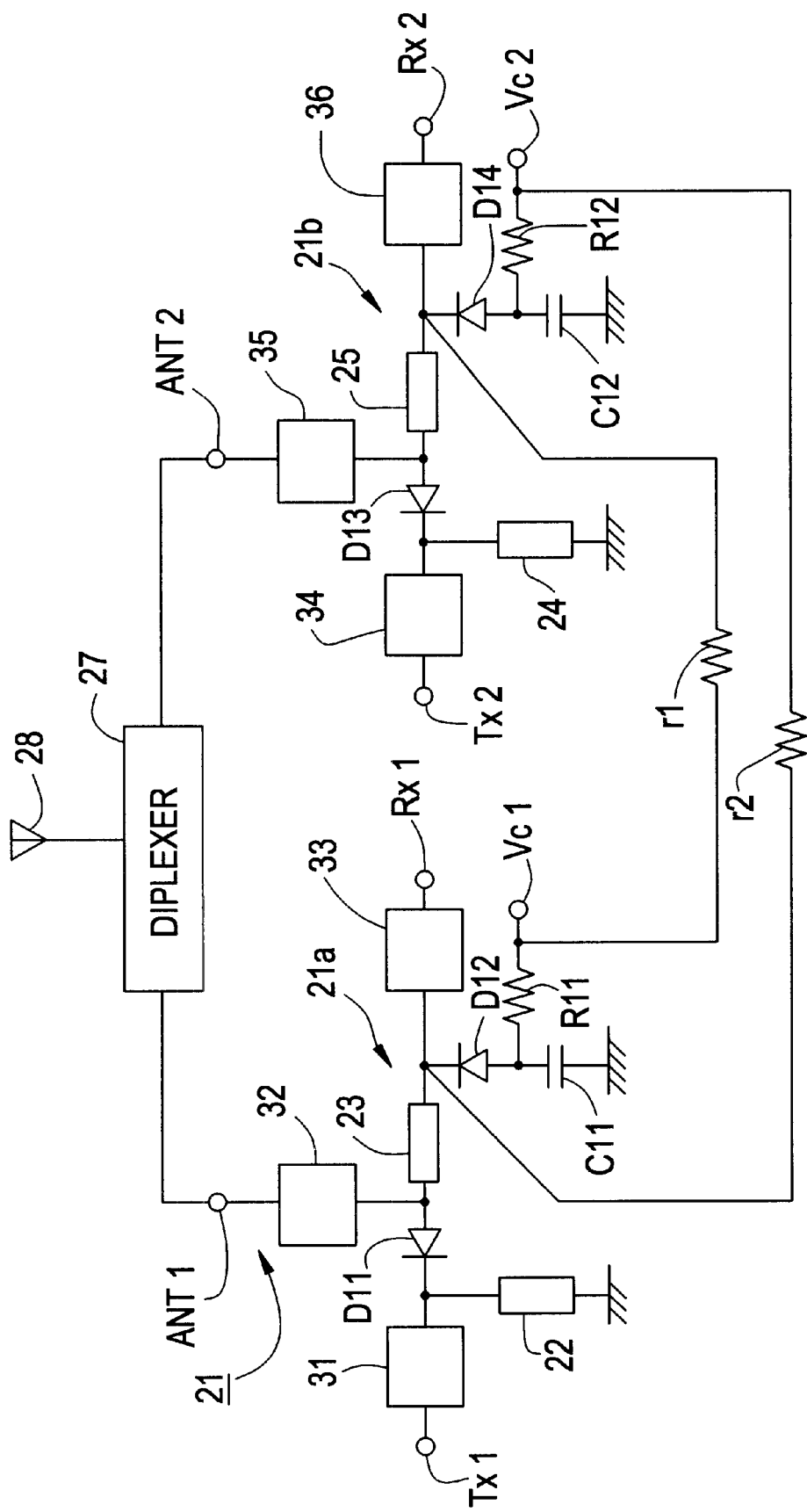
FIG. 7 is an electric circuit diagram illustrating a modification of the high-frequency switch shown in FIG. 1.
Figure 8:
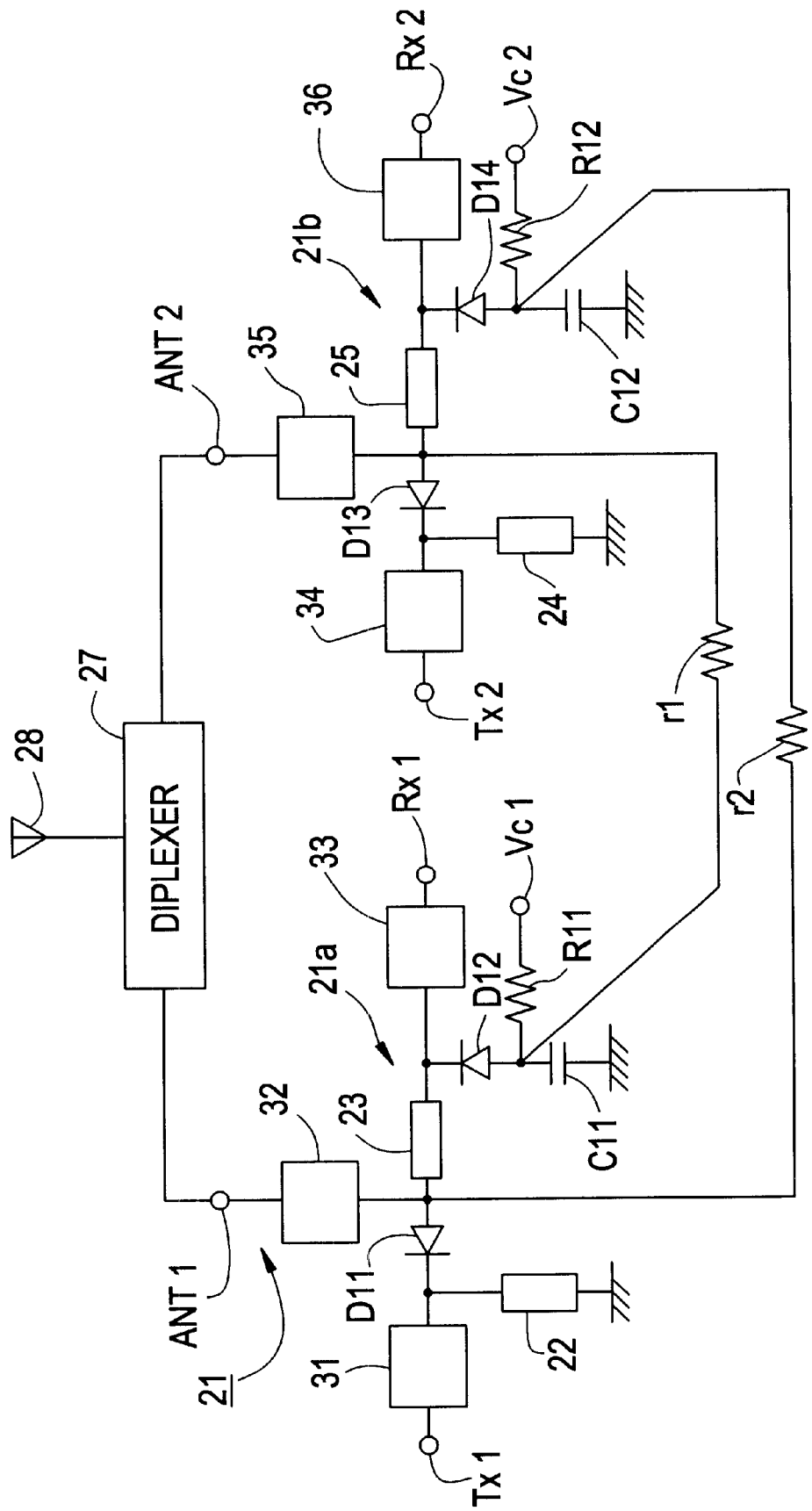
FIG. 8 is an electric circuit diagram illustrating another modification of the high-frequency switch shown in FIG. 1.
Figure 9:
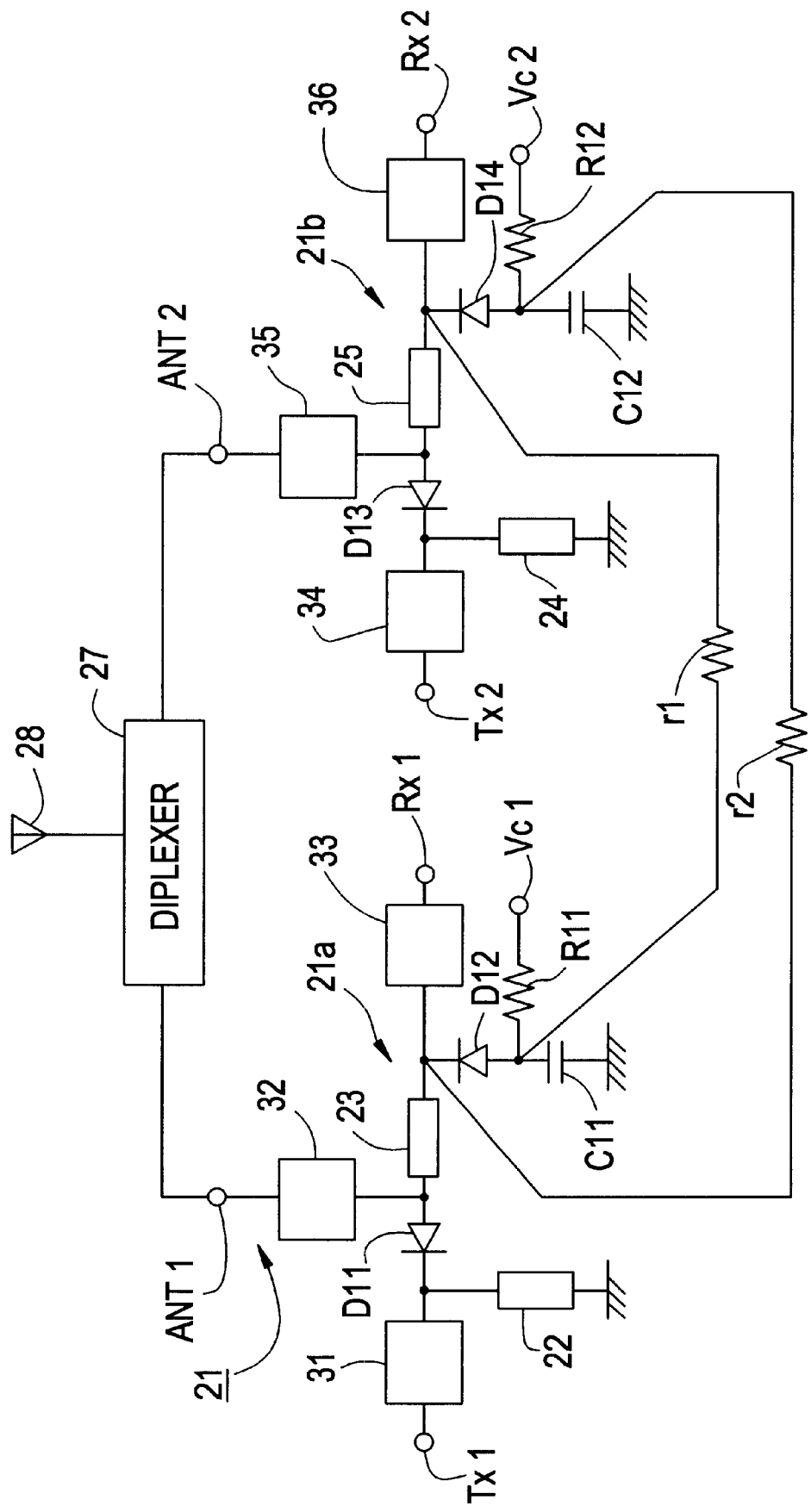
FIG. 9 is an electric circuit diagram illustrating still another modification of the high-frequency switch shown in FIG. 1.

The connection positions of one-side ends of the resistors r1 and r2 for applying given voltages to the diodes of the switches in the non-transmission mode are located between the diodes D13 and D14, and between the diodes D11 and D12, respectively. For example, as shown in FIG. 7, the resistors r2 and r1 are connected between the respective intermediate connection points between the diodes D12 and D14 and the transmission lines 23 and 25, and the voltage control terminals Vc2 and Vc1, respectively. Alternatively, as shown in FIG. 8, the resistors r2 and r1 may be connected between the respective intermediate connection points between the diodes D11 and D13 and the transmission lines 23 and 25, and the respective intermediate connection points between the diodes D14 and D12 and the capacitors C12 and C11, respectively. Or, as shown in FIG. 9, the resistors r2 and r1 may be connected between the respective intermediate connection points between the diodes D12 and D14 and the transmission lines 23 and 25, and the respective intermediate connection points between the diodes D14 and D12 and the capacitors C12 and C11, respectively.

Figure 10:
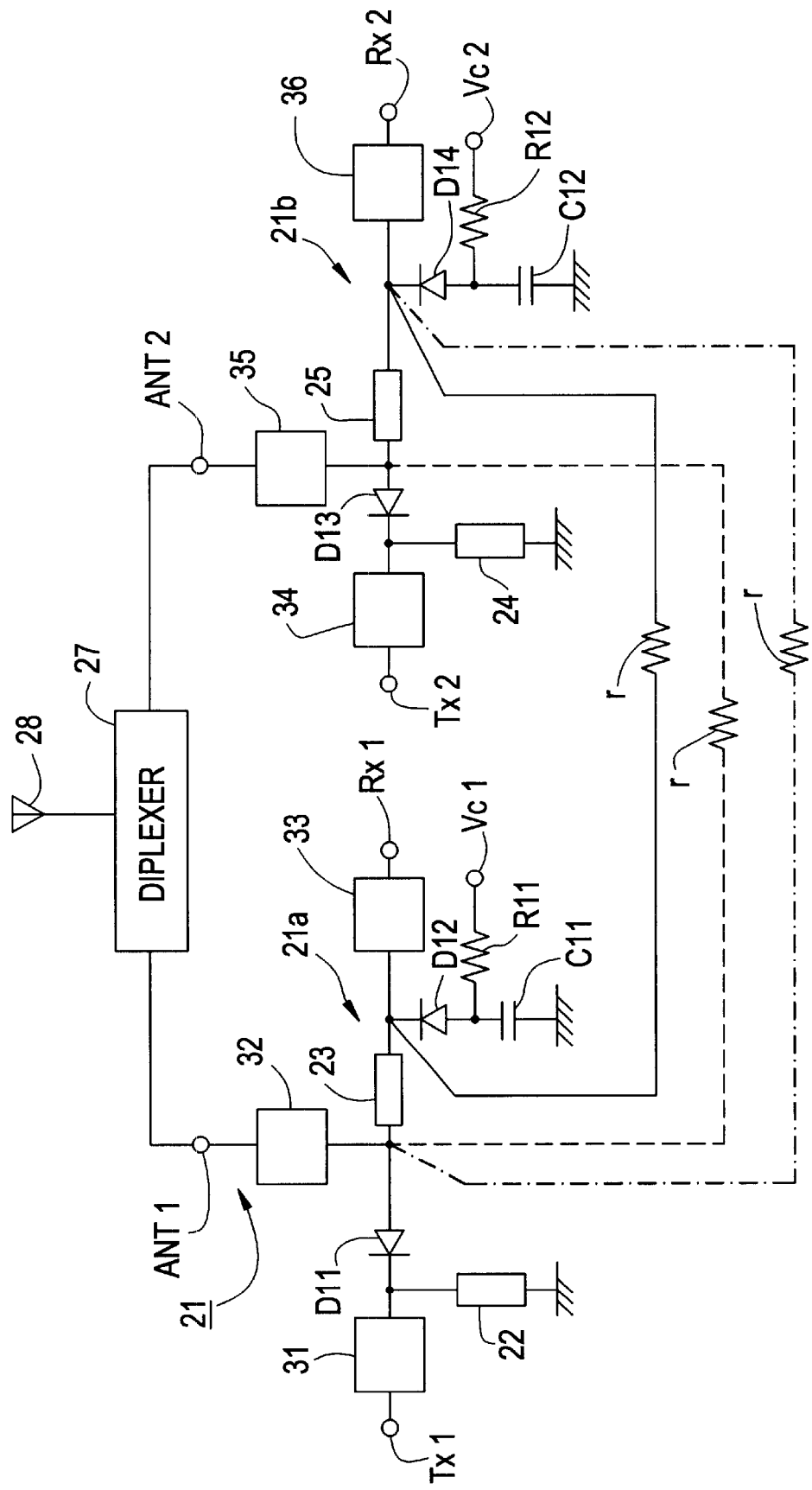
FIG. 10 is an electric circuit diagram illustrating a further modification of the high-frequency switch shown in FIG. 1.

Alternatively, as shown in FIG. 10, the resistor r for applying a voltage may be connected between the intermediate connection point between the diode D12 and the transmission line 23, and the intermediate connection point between the diode D14 and the transmission line 25 (see the solid line). Or, the resistor r may be connected between the intermediate connection point between the diode D11 and the transmission line 23, and the intermediate connection point between the diode D13 and the transmission line 25 (see the dot line). Or, the resistor r may be connected between the intermediate connection point between the diode D11 and the transmission line 23, and the intermediate connection point between the diode D14 and the transmission line 25 (see the chain line).

Figure 11:
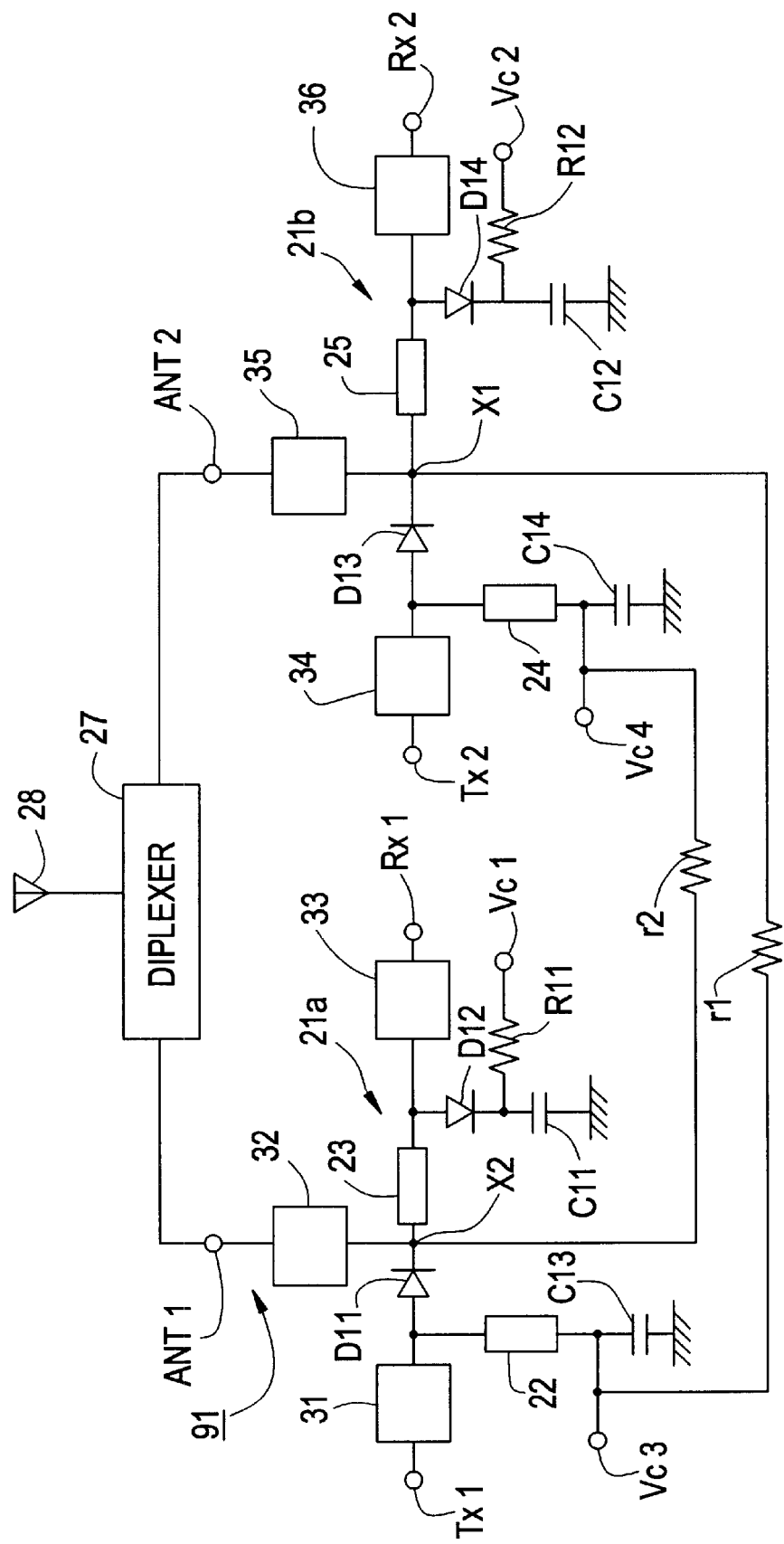
FIG. 11 is an electric circuit diagram showing a second preferred embodiment of a high-frequency switch in accordance with the present invention.

FIG. 11 is an electric circuit diagram showing a second preferred embodiment of a high-frequency switch 91. The high-frequency switch 91 includes two switches 21a and 21b. To the transmission-side terminals Tx1 and Tx2 of the switches 21a and 21b, the anodes of diodes D11 and D13, which are switching elements, are connected via respective filters 31 and 34, respectively. The anode of the diode D11 is grounded via the series circuit of a transmission line 22 and a capacitor 13. Likewise, the anode of the diode D13 is grounded via the series circuit of a transmission line 24 and a capacitor 14. Voltage control terminals Vc3 and Vc4 are connected between the intermediate connection points between the transmission line 22 and the capacitor 13, and the intermediate connection points between the transmission line 24 and the capacitor 14, respectively. The cathodes of the diodes D11 and D13 are connected to the antenna-side terminals ANT1 and ANT2, via filters 32 and 35, respectively.

To the antenna-side terminals ANT1 and ANT2, reception-side terminals Rx1 and Rx2 are connected via the filters 32 and 35, the transmission lines 23 and 25, and the filters 33 and 36, respectively. To the reception-side terminals Rx1 and Rx2, the anodes of the diodes D12 and D14 are connected via the filters 33 and 36, respectively. The cathodes of the diodes D12 and D14 are grounded via bias-cut capacitors C11 and C12, respectively. To the respective intermediate connection points between the cathodes of the diodes D12 and D14, and capacitors C11 and C12, the voltage control terminals Vc1 and Vc2 are connected via resistors R11 ad R12, respectively. The voltage control terminals Vc1 and Vc2, however, may be grounded. Also, to the respective intermediate connection points between the cathodes of the diodes D11 and D13, and the transmission lines 23 and 25, the voltage control terminals Vc4 and Vc3 are connected via resistors r2 ad r1, respectively. In FIG. 11, the same components and the same parts as shown in FIG. 1 are identified by the same reference numerals, and descriptions thereof are omitted.

Next, the transmission through the use of the high-frequency switch 91 will be described. When a positive potential is applied to the voltage control terminal Vc3 and a ground potential is applied to the voltage control terminal Vc1, the positive potential applied to the voltage control terminal Vc3 acts as a forward bias-voltage on the diodes D11 and 12 of the switch 21a. Thereby, the diodes D11 and D12 are turned ON, and the switch 21a enters into a state of the transmission mode. As a result, the GSM transmission signal entered in the transmission-side terminal Tx1 is transmitted to the antenna-side terminal ANT1 via the diode D11. At this time, the GSM transmission signal is not transmitted to the reception-side terminal Rx1. This is because the impedance of the transmission line 23 becomes infinity since the transmission line 23 is grounded by the diode D12, and causes resonance at the transmission frequency.

On the other hand, with respect to the switch 21b, a positive voltage is applied to the voltage control terminal Vc2 and a ground potential is applied to the voltage control terminal Vc4, thereby the switch 21b is brought into the reception mode.

Furthermore, the positive potential which has been applied to the voltage control terminal Vc3, is applied to the intermediate connection point (point X1) between the cathode of the diode D13 of the other switch 21b and the transmission line 25 via the resistor r1, thereby makes the point X1 a given positive potential. This results in a state wherein the diodes D13 and D14 of the switch 21b are being subjected to a voltage. Thereby, the bias voltage of the diodes D13 and D14 is prevented from fluctuating, and hence the capacities of the diodes D13 and D14 are constant. Even if the GSM transmission signal flowing through the switch 21a leaks to the switch 21b, therefore, an occurrence of high harmonic (second harmonic, third harmonic, etc.) signals, from this transmission signal, due to variations in the capacity of the diodes D13 and D14 is inhibited. This leads to an improvement in spurious characteristics due to the non-linearity of the diodes.

Herein, if the resistance value of the resistor r1 is reduced (to approximately 10 kΩ or below), the diode D13 is turned ON, and the stability of the potential of the point X1 is greatly improved. At this time, the switch 21b is in a state of being in neither transmission mode nor reception mode.

When a ground potential is applied to the voltage control terminal Vc2 and a positive potential is applied to the voltage control terminal Vc4, the positive potential applied to the voltage control terminal Vc4 acts as a forward bias-voltage on the diodes D13 and 14 of the switch 21b. Thereby, the diodes D13 and D14 are turned ON, and the switch 21b enters into the transmission mode. As a result, the DCS transmission signal entered in the transmission-side terminal Tx2 is transmitted to the antenna-side terminal ANT2 via the diode D13.

On the other hand, with respect to the switch 21a, a ground potential is applied to the voltage control terminal Vc3 and a positive potential is applied to the voltage control terminal Vc1, thereby the switch 21a is brought into the reception mode.

Furthermore, the positive potential which has been applied to the voltage control terminal Vc4, is applied to the intermediate connection point (point X2) between the cathode of the diode D11 of the other switch 21a and the transmission line 23 via the resistor r2, thereby provides the point X2 with a given positive potential. This results in a state wherein the diodes D11 and D12 of the switch 21a are subjected to a voltage. Thereby, the bias voltage of the diodes D11 and D12 does not fluctuate, and hence the capacities of the diodes D11 and D12 are constant. Even if the DCS transmission signal flowing through the switch 21b leaks to the switch 21a, therefore, the occurrence of high harmonic signals, from this transmission signal, due to variations in the capacity of the diodes D11 and D12, is prevented.

If the resistance value of the resistor r2 is reduced (to approximately 10 kΩ or below), the diode D11 is turned ON, and the stability of the potential of the point X2 is greatly improved. At this time, the switch 21a is in a state of being in neither transmission mode nor reception mode.

Figure 12:
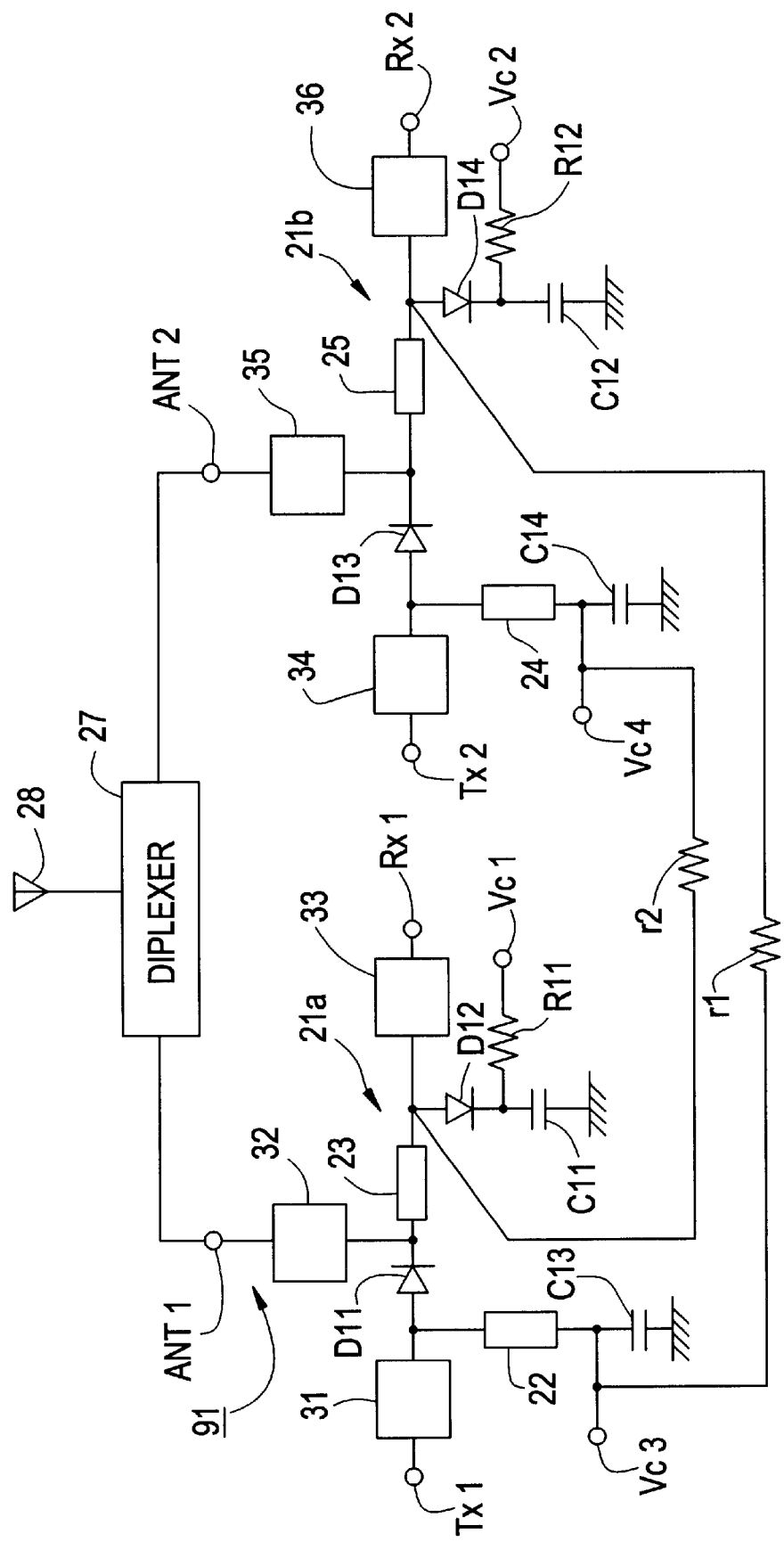
FIG. 12 is an electric circuit diagram illustrating a modification of the high-frequency switch shown in FIG. 11.
Figure 13:
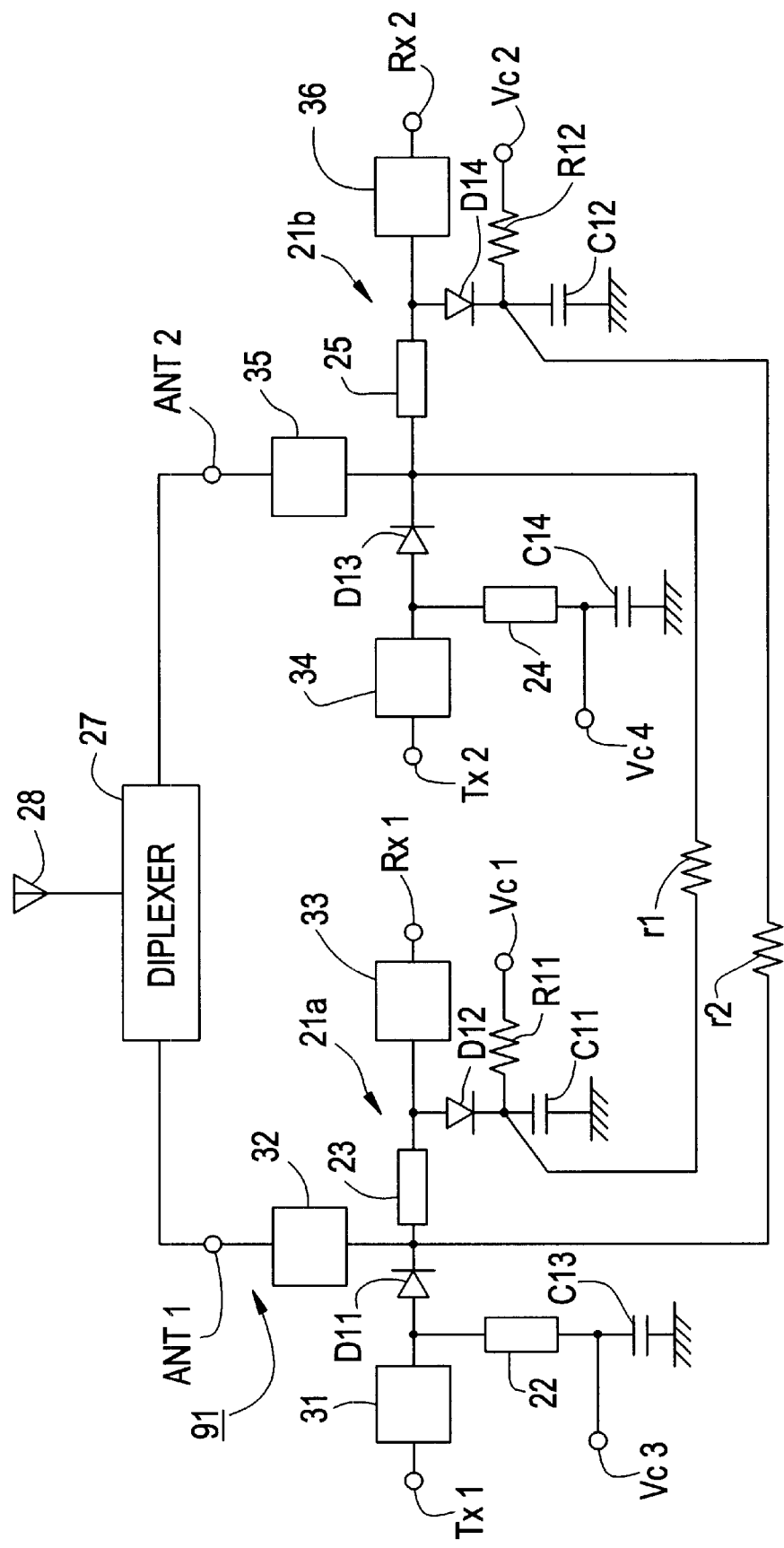
FIG. 13 is an electric circuit diagram illustrating another modification of the high-frequency switch shown in FIG. 11.
Figure 14:
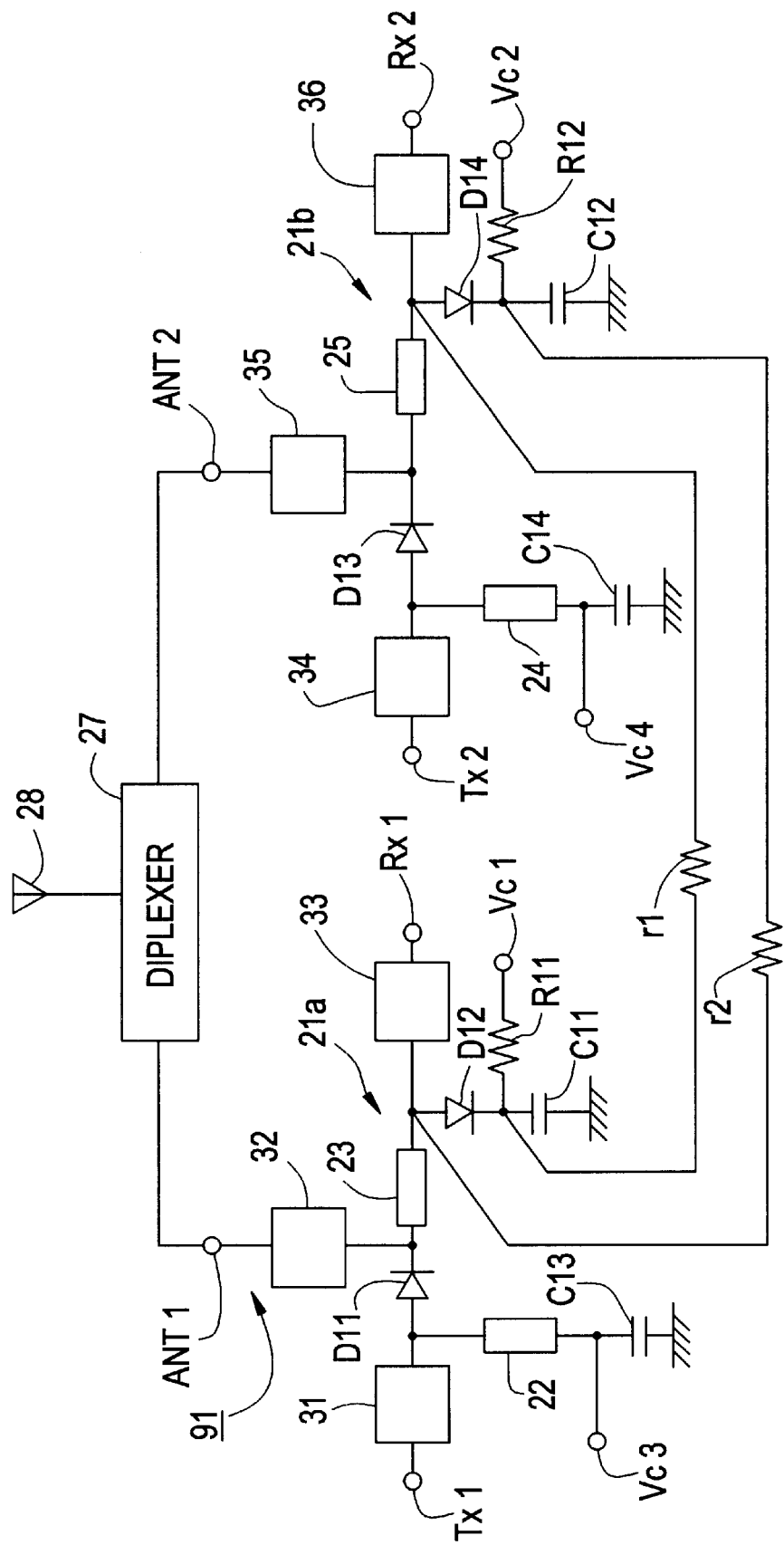
FIG. 14 is an electric circuit diagram illustrating still another modification of the high-frequency switch shown in FIG. 11.
Figure 15:
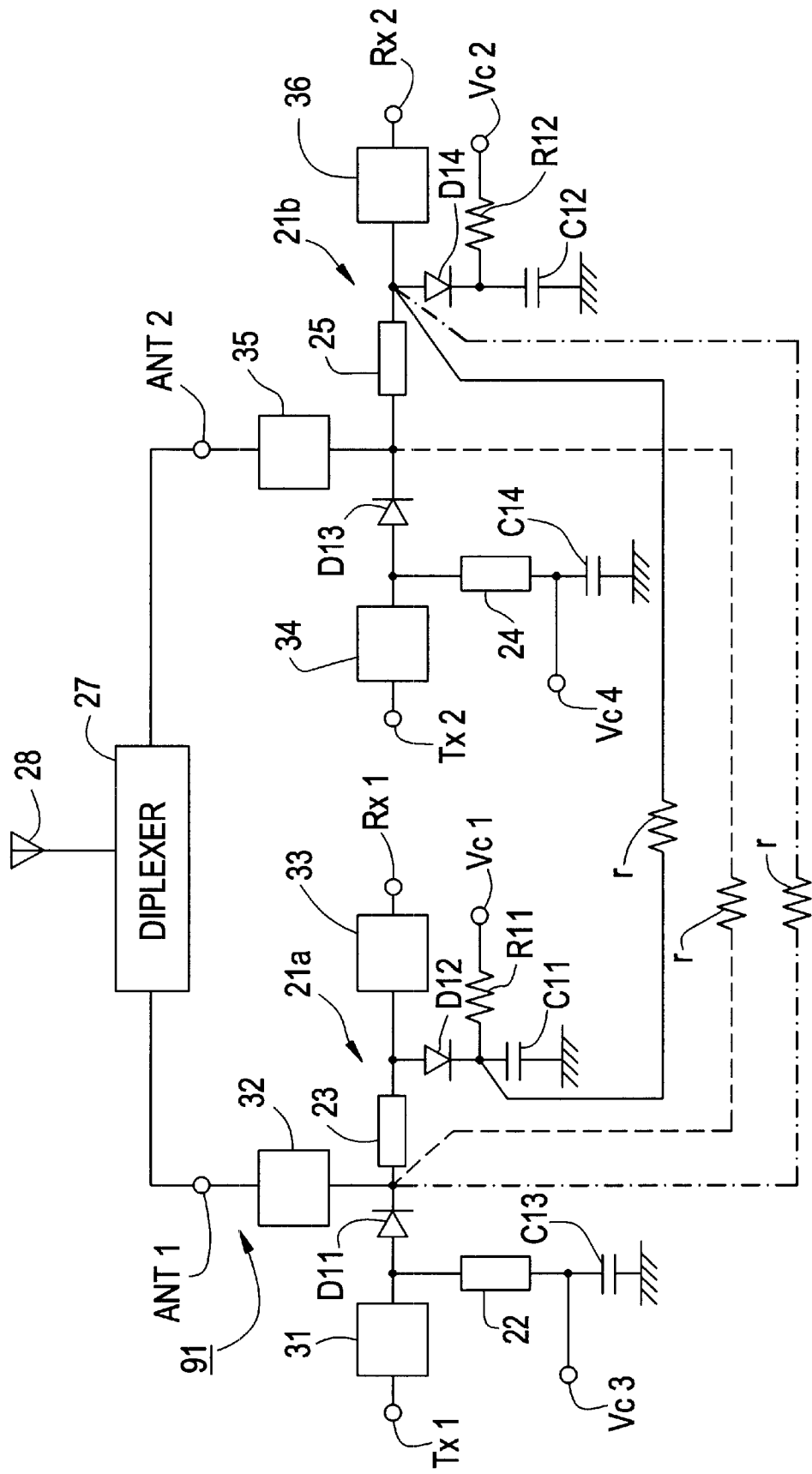
FIG. 15 is an electric circuit diagram illustrating a further modification of the high-frequency switch shown in FIG. 11.
Figure 16:
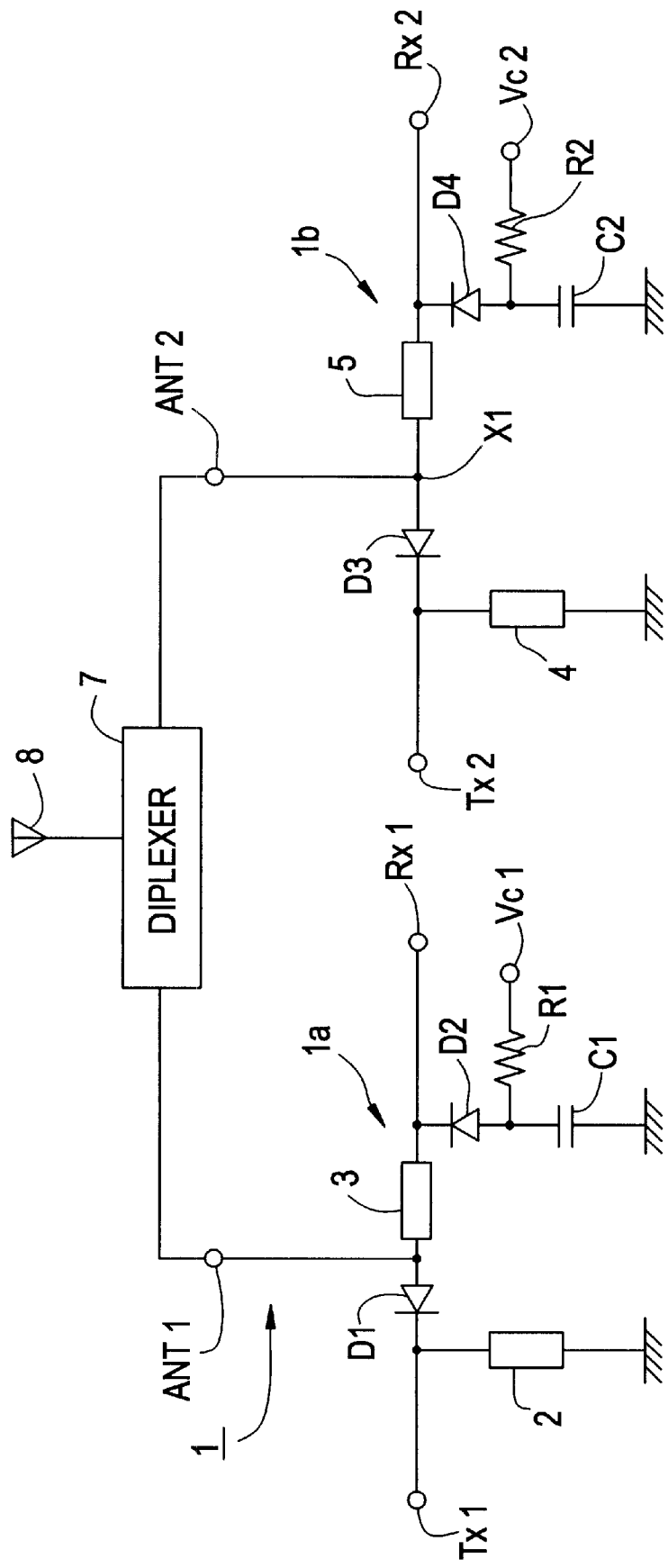
FIG. 16 is an electric circuit diagram showing a conventional high-frequency switch.

The connection positions of one-side end of the resistors r1 and r2 to apply given voltages to the diodes of the switches in the non-transmission mode are only located between the diodes D13 and D14, and between the diodes D11 and D12, respectively. The resistors r1 and r2, therefore, are connected as shown in FIGS. 12 through 14. Alternatively, as shown in FIG. 15, the resistor as a mechanism for applying a voltage may be connected as indicated by any of the solid line, the dot line, and the chain line in the figure.

The high-frequency switch in accordance with the present invention is not limited to the above-described preferred embodiments, but may be modified within the spirit of the present invention. In particular, in the above-described preferred embodiments, both of the resistors r1 and r2 are not necessarily required to be connected. It is only essential that either of the resistors r1 and r2 is connected. Also, apart from diodes, switching elements, transistors, FET, or other suitable elements may be used as switching elements.

As is evident from the above descriptions, in the high-frequency switch in accordance with the present invention, since the mechanism for applying a voltage between the two switching elements of one of the first and second switches when the other of the switches is in a state of the transmission mode is provided, the bias voltage of the one of the switches is prevented from fluctuating, which greatly inhibits the occurrence of high harmonics. As a result, the occurrence of high harmonic signals due to the non-linearity characteristics of the switching elements is prevented, which greatly improves the spurious characteristics.

Moreover, in accordance with preferred embodiments of the present invention, by implementing a laminated high-frequency switch wherein required circuits are built into a single component, the area on a printed circuit board occupied by the high-frequency switch is greatly reduced, and the necessity for matching adjustment mechanisms needed to assemble components for the two switches is eliminated.

While the invention has been described in its preferred embodiments, obviously many modifications and variations of the present invention are possible in the light of the above teachings. It is therefore to be understood that within the scope of the appended claims, the invention may be practiced otherwise than as specifically described.

What is claimed is:

1. A high-frequency switch, comprising:
    a first switch for a first transmission/reception band, said first switch having at least two switching elements;
    a second switch for a second transmission/reception band using a frequency different than the operating frequency of said first transmission/reception band, said second switch having at least two switching elements;
    a first transmission-side terminal provided at the first switch to transmit signals of the first transmission/reception band;
    a second transmission-side terminal provided at the second switch to transmit signals of the second transmission/reception band;
    a first reception-side terminal provided at the first switch such that the at least two switching elements of the first switch are arranged between the first transmission-side terminal and the first reception-side terminal;
    a second reception-side terminal provided at the second switch such that the at least two switching elements of the second switch are arranged between the second transmission-side terminal and the second reception-side terminal; and
    a voltage applying mechanism arranged to apply a voltage between the two switching elements of one of said first and second switches when the other of said first and second switches is in a state of the transmission mode such that said one of said first and second switches is in a state of being in neither the transmission mode nor the reception mode.

2. A high-frequency switch as claimed in claim 1, wherein said voltage applying mechanism includes a resistor electrically connected between said first switch and said second switch.

3. A high-frequency switch as claimed in claim 2, wherein each of said first and second switches comprises:
    a first terminal, a second terminal, a third terminal, and a voltage control terminal;
    a first diode having a cathode that is electrically connected to said first terminal, and an anode that is electrically connected to said second terminal;
    a first transmission line electrically connected between said second terminal and said third terminal;
    a second diode having a cathode that is electrically connected to said third terminal, and an anode that is electrically connected to said voltage control terminal; and
    a second transmission line electrically connected between said first terminal and a ground.

4. A high-frequency switch as claimed in claim 2, wherein said resistor has a resistance that is within a range of from about 500 Ω to about 10 kΩ.

5. A high-frequency switch as claimed in claim 1, wherein each of said first and second switches comprises:
- a first terminal, a second terminal, a third terminal, and a voltage control terminal;
- a first diode having a cathode that is electrically connected to said first terminal, and an anode that is electrically connected to said second terminal;
- a first transmission line electrically connected between said second terminal and said third terminal;
- a second diode having a cathode that is electrically connected to said third terminal, and an anode that is electrically connected to said voltage control terminal; and
- a second transmission line electrically connected between said first terminal and a ground.

6. A high-frequency switch as claimed in claim 5, wherein a plurality of dielectric layers and the first and second transmission lines of each of said first and second switches are arranged to define a laminated body and the first, second, and third terminals, the voltage control terminals of each of said first and second switches, and the first and second diodes of each of said first and second switches, and a plurality of resistors defining said voltage applying mechanism are mounted on a surface of said laminated body.

7. A high-frequency switch as claimed in claim 1, wherein each of said first and second switches comprising:
- a first terminal, a second terminal, a third terminal, and a voltage control terminal;
- a first diode having an anode that is electrically connected to said first terminal, and a cathode that is electrically connected to said second terminal;
- a first transmission line electrically connected between said second terminal and said third terminal;
- a second diode electrically connected between said third terminal and a ground such that an anode of said second diode is electrically connected to said third terminal; and
- a second transmission line electrically connected between said first terminal and said voltage control terminal.

8. A high-frequency switch as claimed in claim 7, wherein a plurality of dielectric layers and the first and second transmission lines of each of said first and second switches are arranged to define a laminated body and the first, second, and third terminals, the voltage control terminals of each of said first and second switches, and the first and second diodes of each of said first and second switches, and a plurality of resistors defining said voltage applying mechanism are mounted on a surface of said laminated body.

9. A high-frequency switch as claimed in claim 7, wherein a length of each said first and second transmission lines is in the range of about $\lambda/12$ to about $\lambda/4$, where $\lambda$ is the wave length at a desired frequency.

10. A high-frequency switch as claimed in claim 1, wherein each of said first and second switches includes a diode.

11. A high-frequency switch, comprising:
- a first switch having at least two switching elements, and having a first voltage control terminal arranged to switch a first high-frequency signal between the transmission-side and the reception-side by applying a predetermined voltage to said at least two switching elements of said first switch;
- a second switch having at least two switching elements, and having a second voltage control terminal arranged to switch a second high-frequency signal between the transmission-side and the reception-side by applying a predetermined voltage to said at least two switching elements of said second switch, the frequency band of the second high-frequency signal is different from that of the first high-frequency signal;
- a first transmission-side terminal provided at the first switch to transmit signals of the first transmission/reception band;
- a second transmission-side terminal provided at the second switch to transmit signals of the second transmission/reception band;
- a first reception-side terminal provided at the first switch such that the at least two switching elements of the first switch are arranged between the first transmission-side terminal and the first reception-side terminal;
- a second reception-side terminal provided at the second switch such that the at least two switching elements of the second switch are arranged between the second transmission-side terminal and the second reception-side terminal;
- wherein said first voltage control terminal is connected between said two switching elements of said first switch via a resistor so that a voltage is applied between the two switching elements in said second switch when a predetermined voltage is applied to said first voltage control terminal in said first switch such that said second switch is in a state of being in neither the transmission mode nor the reception mode.

12. A high-frequency switch as claimed in claim 11, wherein said resistor has a resistance that is within a range of about 500 $\Omega$ to about 10 k$\Omega$.

13. A high-frequency switch as claimed in claim 11, wherein each of said switching elements includes a diode.

14. A high-frequency switch as claimed in claim 11, wherein each of said first and second switches comprising:
- a first diode having an anode that is electrically connected to said first terminal, and a cathode that is electrically connected to said second terminal;
- a first transmission line electrically connected between said second terminal and said third terminal;
- a second diode electrically connected between said third terminal and a ground such that an anode of said second diode is electrically connected to said third terminal; and
- a second transmission line electrically connected between said first terminal and said voltage control terminal.

15. A high-frequency switch as claimed in claim 14, wherein a plurality of dielectric layers and the first and second transmission lines of each of said first and second switches are arranged to define a laminated body and the first, second, and third terminals, the voltage control terminals of each of said first and second switches, and the first and second diodes of each of said first and second switches, and a plurality of resistors defining said voltage applying mechanism are mounted on a surface of said laminated body.

16. A high-frequency switch as claimed in claim 14, further comprising a series circuit including a transmission line and a capacitor, wherein the anodes of each of said first and second diodes are grounded via said series circuit including said transmission line and said capacitor.

17. A high-frequency switch as claimed in claim 14, further comprising capacitors, wherein said first and second voltage control terminals are connected between intermediate connection points between said first and second transmission lines and said capacitors.

* * * * *